United States Patent
Bozio et al.

(10) Patent No.: US 6,366,041 B1
(45) Date of Patent: Apr. 2, 2002

(54) RAILWAY SWITCH MACHINE MOTOR CONTROL APPARATUS

(75) Inventors: Robert P. Bozio, Pittsburgh; Raymond C. Franke, Glenshaw, both of PA (US)

(73) Assignee: Union Switch & Signal, Inc., Pittsburgh, PA (US)

( * ) Notice: Subject to any disclaimer, the term of this patent is extended or adjusted under 35 U.S.C. 154(b) by 0 days.

(21) Appl. No.: 09/490,976

(22) Filed: Jan. 24, 2000

(51) Int. Cl.[7] ............................. H02P 1/00; H02P 1/22; H02P 1/40; H02P 3/00; H02P 3/20

(52) U.S. Cl. ..................... 318/280; 318/281; 318/283; 318/284; 318/455; 246/219; 246/226; 246/132

(58) Field of Search .................... 318/280–286, 318/293, 452–455, 466, 468; 246/218, 221, 225, 226, 132, 134

(56) References Cited

U.S. PATENT DOCUMENTS

| | | | |
|---|---|---|---|
| 3,588,652 A | * 6/1971 | Lewis | 318/282 |
| 3,748,557 A | * 7/1973 | Mittelstaedt | 318/256 |
| 4,303,872 A | * 12/1981 | Alf et al. | 318/257 |
| 4,307,302 A | 12/1981 | Russell | |
| 4,550,889 A | 11/1985 | Emmel | |
| 4,703,303 A | 10/1987 | Snee | |
| 4,756,494 A | 7/1988 | Kondratenko et al. | |
| 4,934,633 A | 6/1990 | Ballinger et al. | |
| 5,160,875 A | * 11/1992 | Kono | 318/280 |
| 5,412,369 A | 5/1995 | Kirchner | |
| 5,502,367 A | 3/1996 | Jones | |
| 5,527,005 A | 6/1996 | Wydotis | |
| 5,747,954 A | 5/1998 | Jones et al. | |
| 5,806,809 A | 9/1998 | Danner | |
| 5,834,914 A | 11/1998 | Moe et al. | |
| 5,852,350 A | 12/1998 | Le Voir | |
| 5,914,576 A | * 6/1999 | Barba | 318/282 |
| 6,002,225 A | * 12/1999 | Gleim et al. | 318/373 |
| 6,157,152 A | * 12/2000 | Sekine et al. | 318/266 |

FOREIGN PATENT DOCUMENTS

JP 58123383 A * 7/1983 .................. 318/280

* cited by examiner

Primary Examiner—Robert E. Nappi
Assistant Examiner—Edgardo San Martin
(74) Attorney, Agent, or Firm—Kirk D. Houser; Eckert Seamans Cherin & Mellott, LLC

(57) ABSTRACT

A motor control apparatus for a reversible motor of a railway switch machine includes a conditional power source having an output voltage. A motor control circuit includes inputs for inputting the voltage from the power source, inputs for inputting a normal signal and a reverse signal, two output terminals for electrical connection to two input terminals of the reversible motor, and a relay logic circuit including a pair of double pole, double throw relays. The contacts of these relays: (a) output the voltage to the two output terminals in response to the normal signal, (b) output an inverted polarity of the voltage to the two output terminals in response to the reverse signal, and (c) short the two output terminals in response to absence of both of the normal and reverse signals.

27 Claims, 5 Drawing Sheets

RAILWAY SWITCH MACHINE MOTOR CONTROL APPARATUS

BACKGROUND OF THE INVENTION

1. Field of the Invention

The invention relates to motor control apparatus and, more particularly, to a motor control apparatus for a railway switch machine. The invention also relates to a two-terminal control apparatus for a two-terminal reversible motor.

2. Background Information

In order to optionally switch a railroad train operating on a first track to a second, merging track, it is typical to provide a switch with a pair of "switch points" which are selectively movable horizontally to deflect the train toward one or the other of the tracks. The switch can encompass a pair of switch rail lengths of the second track which extend several feet in length with the switch points being essentially tapered end sections of those rail lengths. The switch points, typically labeled as "normal" and "reverse", are selectively movable back and forth between a pair of stock rails. These provide a normal position in which the train is directed toward the first track by the normal switch point being positioned against a first rail of the first track, and a reverse position in which the train is directed toward the second track by the reverse switch point being positioned against the opposite rail of the first track.

The switch points are typically attached to each other via a plurality of tie rods, at least one of which doubles as a switch throw rod. The throw rod is driven by a remotely controlled electrical switch machine, or, in some instances, by a hand lever operated switch machine, between extended and retracted positions. Depending upon the side of the track on which the switch machine is placed, the extended position can be the normal or the reverse condition of the switch points, and vice versa for the retracted position.

Switch machines employ reversible electric motors to drive a series of gears which are attached to the throw rod. Depending upon the control signals received at the switch machine, the motor is driven one direction or the other to either extend or retract the throw rod and, thus, move the switch points between normal and reverse switching positions. Lock connecting rods are also attached to the switch points. The lock connecting rods passively move back and forth with the switch points and cooperate with locking elements in the machine housing to lock the switch into a normal or a reverse switch position.

Referring to FIG. 1, a switch point adjuster 2 is schematically depicted. The exemplary switch point adjuster 2 utilizes two separate rods 3, 4 and a frog 5, although a single operating rod (not shown) may be employed. The exemplary switch point adjuster 2 is located at the center of the track 6, although other such adjusters may be employed on the left side (with respect to FIG. 1) and opposite the switch machine 8. The first rod 3 connects the switch point adjuster 2 to the frog 5, and the second rod 4 connects the switch point adjuster 2 to the operating bar 10 of the switch machine 8. Thus, when the switch machine 8 throws six inches, the slack is taken up in the switch point adjuster 2 so that the frog 5 is only moved its required amount. Both operating rods 3, 4 are supported by support rollers (not shown).

As shown in FIG. 2, a railroad switch includes a pair of switch points 12,14 which are linked by one or more tie rods 16. The switch points 12,14 are selectively movable between a "normal" position (as shown) and a "reverse" position. In the illustrated normal position, the switch point 12, commonly called the normal switch point, is positioned against a stationary stock left rail 18, and the switch point 14, commonly called a reverse switch point, is moved away from a stationary stock right rail 20. The stock left and right rails 18 and 20 are anchored to a plurality of cross ties 22 via rail anchors 24 in a conventional manner. In a normal position, the normal switch point 12 directs a train entering the railroad switch straight through the intersection via the right stock rail 20 and the switch point 12, which tapers outward into a straight left rail 26 past the switch.

In a reverse position (not shown) both the normal switch point 12 and the reverse switch point 14 are moved to the right (with respect to FIG. 2) with the normal switch point 12, thus, moving away from the stock left rail 18 and the reverse switch point 14 moving to a position against the stock right rail 20. The reverse switch point 14 is then in a position to direct the train to the left via the left rail 18, which curves to the left past the switch, and via the reverse switch point 14, which tapers outward to a curved right track 28 past the switch.

The switch points 12 and 14 are selectively moved via a switch machine 30. The switch machine 30 includes a reversible electric motor (M) 31 (shown in hidden line drawing) in a motor housing 32. The motor 31 is connected to drive a series of gears 33,34,35 (shown in hidden line drawing) which, in turn, drive a throw bar 36 (shown in hidden line drawing), either to the left or the right (with respect to FIG. 2). The throw bar 36 is connected to a throw rod 38 via a linkage 40. The throw rod 38, in turn, is connected to the tie rod 16 via a switch basket 41. The switch basket 41 is internally threaded to receive threads 42 on the throw rod 38, in order that the switch point position at either end of travel of the throw rod 38 is adjustable. For example, a typical stroke length for the throw bar 36 would be approximately five inches.

Historically, switch machine motor controls employed mostly 3-wire or wire control for permanent magnet or wound field motors, respectively.

In one system, power is switched to a switch machine motor (M) 42, as shown in FIG. 3, using two vital relays (not shown), the Normal Switch Relay (NSR) and the Reverse Switch Relay (RSR). Input power for the motor 42 is controlled by normal relay contacts 44,45 and reverse relay contacts 46,47. The contacts 44,45,46,47 are connected in a manner to invert the polarity of the power to the motor 42 depending upon which one of the two vital relays is energized. With both relays de-energized, the normally open contacts 44,45,46,47 open the circuit on both the input and output sides thereof. This protects the input power source from a lighting strike at the switch machine, although it does nothing to stop a stray voltage from operating the motor 42 inadvertently.

In a switch machine, linear motion of the mechanism moving the points (such as 12 and 14 of FIG. 2) is converted into rotary motion. Rotary operated cam switches, in turn, are used to open the motor circuit at the end of the stroke and steer current to change direction. The three-wire control circuit of FIG. 3 includes cam switch (CSw1) 48 and cam switch (CSw2) 49. For normal rotation, CSw1 is closed for most of the cycle and, then, opens at the end of the cycle to open the motor circuit and stop the motor 42. For reverse rotation, CSw2 is closed for most of the cycle and, then, opens at the end of the cycle to open the motor circuit and stop the motor 42.

U.S. Pat. No. 4,756,494 discloses vital two-wire switch control circuits for a railroad switch machine, which is operable to either of two directions depending upon the polarity of energy applied thereto. A mechanically-interlocked, reverse-acting, dual-coil contactor is used to alternately establish positive or negative current paths to a permanent magnet motor. Other reverse motor contacts and normal motor contacts allow energization of coils of the reversing contactor which coils have associated normal and reverse motor contacts.

U.S. Pat. No. 5,747,954 discloses a two-terminal configuration having contacts at the terminals of the motor. An electronic controller circuit for the power down function of a highway crossing guard mechanism eliminates the "pumping" condition that can cause undue stress and damage to the guard mechanism. For the up direction, power is supplied through a contact to the motor and through another contact from the motor. At approximately 90°, a controller contact opens and other contacts drop to "b" positions. One contact feeds power to a hold clear solenoid coil that sets the brake for the crossing gate arm. Then, for power down operation, power is supplied to the motor through a MOSFET and diode of a power down module until, at approximately 45°, another contact is opened.

U.S. Pat. No. 5,806,809 discloses a switch point detection system and method that uses a series of proximity detectors positioned proximate the switch point(s) of a railroad switch. A switch machine and a motor are connected by three wires to a biased neutral controller.

U.S. Pat. No. 5,412,369 discloses a two-wire distribution system having two-wire transmission lines for electrical loads.

U.S. Pat. No. 4,703,303 discloses a sold state railroad gate controller having a logic circuit.

In known switch machine motor controls, the relay contacts are not protected from arcing due to switching direct current (DC) into an inductive load (i.e., the motor), and DC power is applied continuously to the relay contacts. Energizing the relay applies this power to the switch machine motor. As the contacts come together, a small arc is produced between the contacts as the inrush current flows to start turning the motor. If the relay is de-energized while the motor is running, then the arc will be much larger, thereby causing permanent damage or erosion to the contacts. Accordingly, there is room for improvement.

SUMMARY OF THE INVENTION

The present invention provides improvements in the control of motors for railway switch machines.

As one aspect of the invention, a control apparatus for a railway switch machine comprises a power source having a voltage, and a circuit. The circuit includes means for inputting the voltage from the power source, means for inputting a normal signal and a reverse signal, two output terminals for electrical connection to two input terminals of a reversible motor of the switch machine, and output means for: (a) outputting the voltage to the two output terminals in response to the normal signal, (b) outputting an inverted polarity of the voltage to the two output terminals in response to the reverse signal, and (c) shorting the two output terminals in response to absence of both of the normal and reverse signals.

Preferably, the output means includes a plurality of relays having a plurality of contacts, and means employing the normal and reverse signals of the means for inputting for preventing switching of the contacts of the relays when the voltage or the inverted polarity of the voltage is applied to the input terminals of the reversible motor.

Also, the output means may include means for closing the contacts of the relays before the voltage or the inverted polarity of the voltage is applied to the input terminals of the reversible motor.

Further, the output means may include means for opening the contacts of the relays after the voltage or the inverted polarity of the voltage is removed from the input terminals of the reversible motor.

As another refinement, the output means may include means for opening the contacts of the relays after the reversible motor is de-energized and has stopped rotating.

The output means may include means for preventing switching of the contacts of the relays for a predetermined time after the voltage or the inverted polarity of the voltage is removed from the input terminals of the reversible motor in order to prevent the switching when the reversible motor is rotating.

Preferably, the relays include a normal relay for outputting the voltage to the two output terminals in response to the normal signal, and a reverse relay for outputting the inverted polarity of the voltage to the two output terminals in response to the reverse signal, and the output means further includes means for preventing energization of the normal and reverse relays at the same time.

As another aspect of the invention, a control apparatus for a motor of a railway switch machine comprises a power source having first and second outputs; a first relay including a first pole having double throw contacts, and including a second pole having at least one contact, with the first pole of the first relay being electrically connected to a first input of the motor, and with a first contact of the first pole of the first relay being electrically connected to the first output of the power source; a second relay including a first pole having double throw contacts, and including a second pole having at least one contact, with the first pole of the second relay being electrically connected to a second input of the motor, with a second contact of the first pole of the first relay being electrically connected to: (a) a second contact of the first pole of the second relay, (b) the second pole of the first relay, and (c) the second pole of the second relay, and with the contact of the second pole of the first relay being electrically connected to: (a) the contact of the second pole of the second relay, and (b) the second output of the power source; means for inputting first and second signals; and means employing the first and second signals for controlling energization of the first or second relays, in order that: (a) energization of the first relay electrically connects the first output of the power source with the first input of the motor through the first contact and the first pole of the first relay, and electrically connects the second output of the power source with the second input of the motor through the contact and the second pole of the first relay and through the second contact and the first pole of the second relay, (b) energization of the second relay electrically connects the first output of the power source with the second input of the motor through the first contact and first pole of the second relay, and electrically connects the second output of the power source with the first input of the motor through the contact and the second pole of the second relay and through the second contact and the first pole of the first relay; and, otherwise, (c) energization of neither the first relay nor the second relay electrically connects the first input to the second input of the motor through the first pole and the second contact of the first relay and through the second contact and the first pole of the second relay.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

In the railroad industry, "vital" is a term applied to a product or system that performs a function that is critical to safety, while "non-vital" is a term applied to a product or system that performs a function that is not critical to safety. Additionally, "fail-safe" is a design principle in which the objective is to eliminate the hazardous effects of hardware or software faults, usually by ensuring that the product or the system reverts to a state known to be safe.

Figure 1:
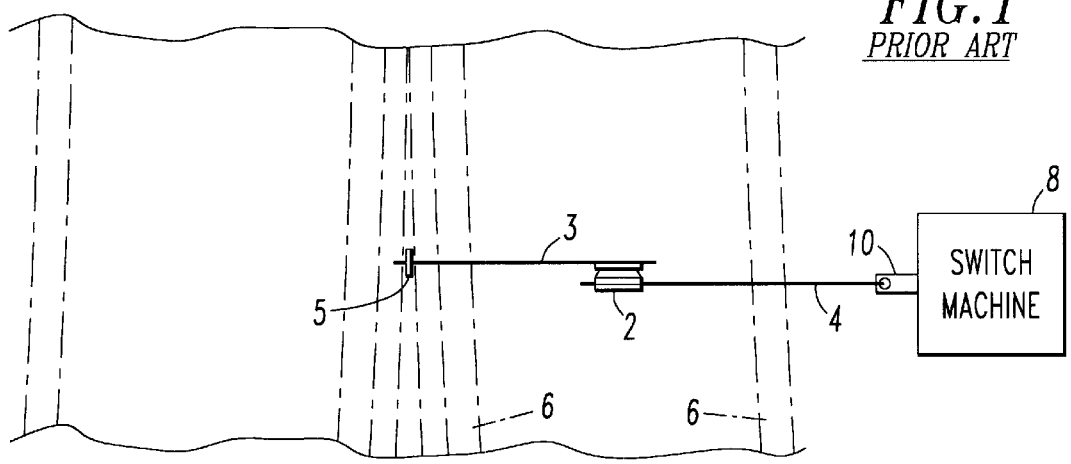
FIG. 1 is a schematic depiction of a conventional switching configuration, showing a switch machine and a switch point adjuster utilizing two operating rods.
Figure 2:
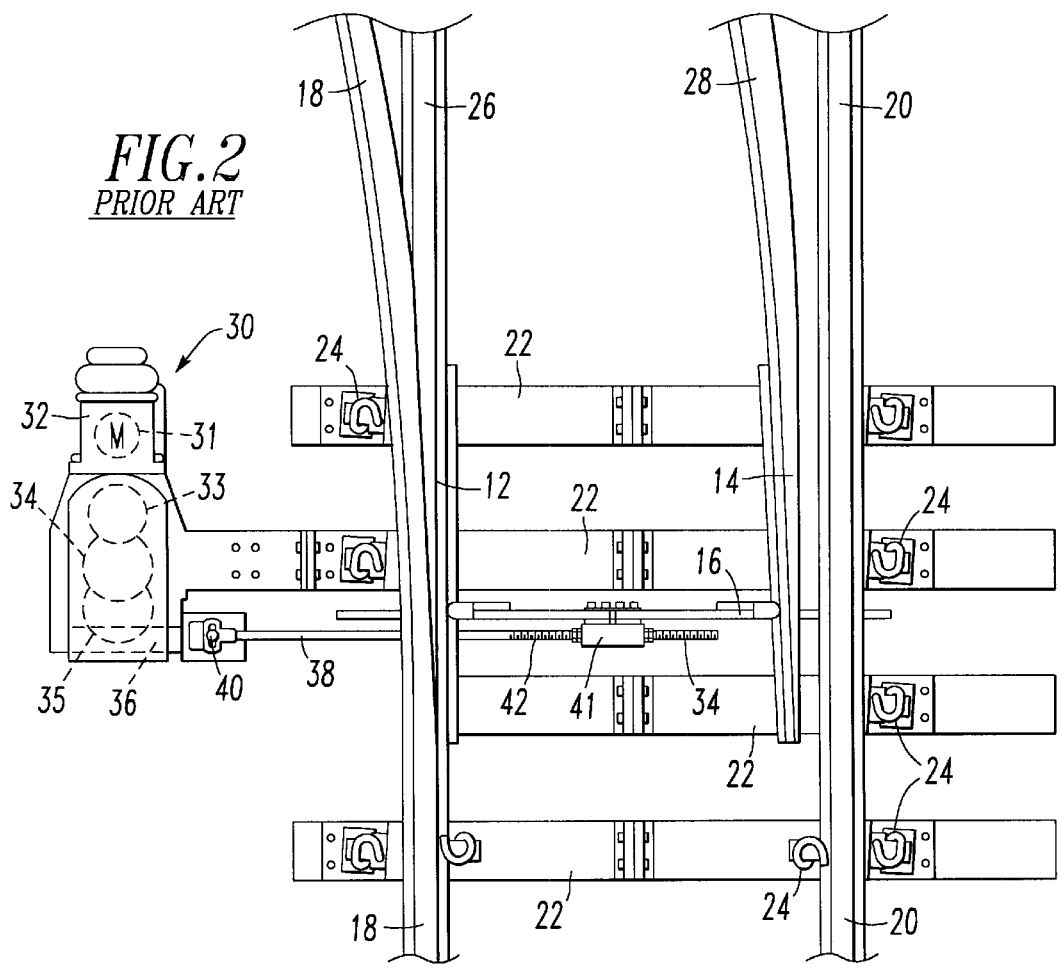
FIG. 2 is a top plan view of a switch machine with the outline of the motor and switch operating gears shown in hidden line drawing, and with the switch points switched to a "normal" position in which a train would continue straight through the intersection.
Figure 3:
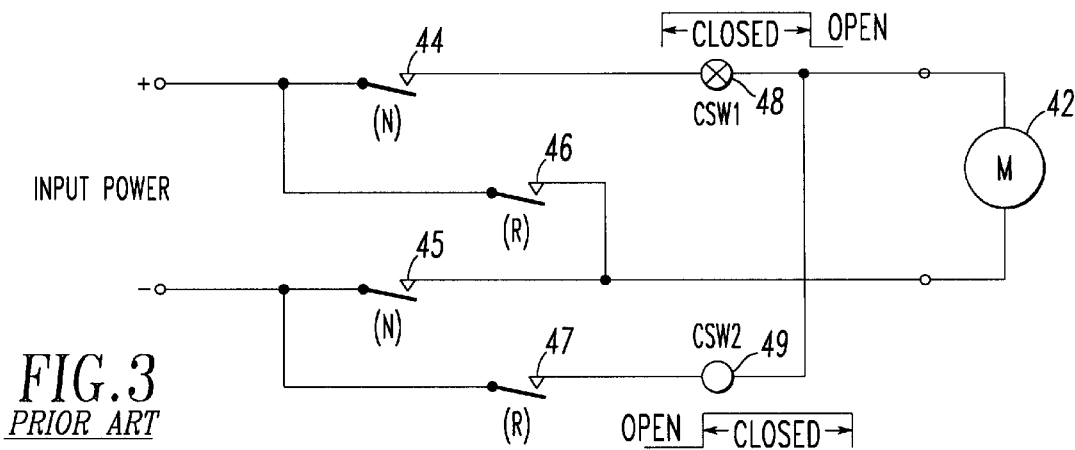
FIG. 3 is a schematic diagram showing 3-wire motor control.
Figure 4:
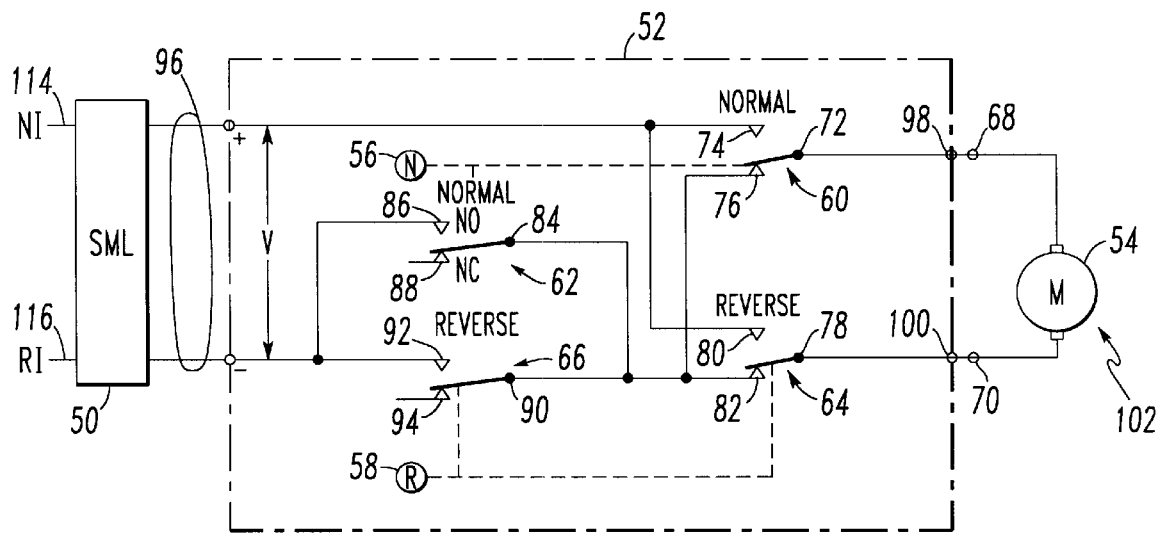
FIG. 4 is a schematic diagram of a power source, relay contacts and a motor in accordance with the present invention.
Figure 8:
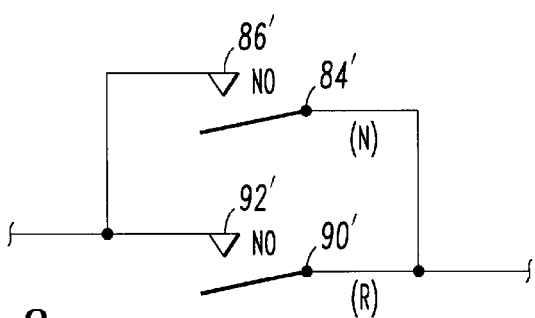
FIG. 8 is a schematic diagram of a portion of the relay contacts of FIG. 4 in accordance with another embodiment of the invention.

FIG. 4 shows a vital power source 50 and a two-wire motor control circuit 52, or Motor Reversing Unit (MRU), in accordance with the present invention, for a reversible switch machine motor (M) 54. A normal relay (N) 56 and a reverse relay (R) 58 control double throw contacts 60,62 and 64,66, respectively, between the power source 50 and the input terminals 68,70 of the motor 54. The first poles 72,78 of the relays 56,58 have normally open (NO) contacts 74,80 and normally closed (NC) contacts 76,82, respectively. The second poles 84,90 of the respective relays 56,58 similarly have normally open contacts 86,92 and normally closed contacts 88,94. Alternatively, as shown in FIG. 8, second poles 84',90' of corresponding normal and reverse relays have normally open contacts 86',92', respectively, and the normally closed contacts 88,94 of FIG. 4 may be eliminated.

A power source, such as the exemplary Switch Machine Lock (SML) 50, is employed to energize the motor control circuit (or MRU) 52 and, in turn, the motor 54. The MRU 52 is employed in conjunction with the SML 50 to control and power the DC motor 54 of switch machine 102. The exemplary SML 50 is a vital power source having an exemplary output voltage (V) of about 20 to 120 volts DC. The SML 50 is a conditional power supply having one or more inputs NI,RI having a signal with a first state (e.g., active) and a second state (e.g., inactive). The SML 50 is energized for the first state and is de-energized for the second state of those one or more inputs. In the exemplary embodiment, the SML 50 has two inputs NI,RI, as discussed below in connection with FIG. 5. Briefly, the SML 50 is energized whenever either one of the two inputs NI,RI is active. The outputs 96 of the SML 50 are electrically connected to the inputs (+,–) of the motor control circuit 52 to provide a voltage thereto. The relay logic of the MRU 52 functions to: (a) output the SML voltage to output terminals 98,100 in response to the normal relay 56 being energized, (b) output an inverted polarity of the SML voltage to the output terminals 98,100 in response to the reverse relay 58 being energized, and (c) short the output terminals 98,100 in response to both of the normal and reverse relays 56,58 being de-energized. The output terminals 98,100 are suitably electrically connected (e.g., by wires) to the respective input terminals 68,70 of the motor 54.

A main function of the MRU 52 is to reverse the polarity of the voltage on the terminals 68,70 that carry power to the motor 54. Furthermore, the relay contacts 60,62,64,66 are wired to short the motor terminals 68,70 and open the input from the SML 50 when both relays 56,58 are de-energized. This method is a safety enhancement because it eliminates the chance of inadvertent motor operation by preventing induced voltages and, also, protects the equipment in the wayside house (not shown) from lightning damage. Also, disconnecting the SML 50 from the motor 54 greatly reduces the risk of damage to the power source 50, particularly if it is electronic, due to a lightning strike at switch machine 102. As discussed below in connection with FIG. 5, the exemplary MRU 52 accepts inputs (normal and reverse) 110,112 from either relay logic (not shown) or from a programmable logic controller (not shown) in order to activate the proper relay 56,58 and, thus, provide the correct polarity of voltage for the motor 54. The MRU 52 also controls the normal (NI) and reverse (RI) inputs of the SML 50.

The normal relay 56 includes first pole 72 having double throw contacts 74,76 and second pole 84 having double throw contacts 86,88. The first pole 72 is electrically connected through output 98 to the first input 68 of the motor 54, and the normally open contact 74 of pole 72 is electrically connected to the positive (+) output of SML 50. The reverse relay 58 includes first pole 78 having double throw contacts 80,82 and a second pole 90 having double throw contacts 92,94. The first pole 78 is electrically connected through output 100 to the second input 70 of the motor 54. The normally closed contact 76 is electrically connected to: (a) the normally closed contact 82, (b) the second pole 84 of the normal relay 56, and (c) the second pole 90 of the reverse relay 58. The normally open contact 86 of the second pole 84 of the normal relay 56 is electrically connected to: (a) the normally open contact 92 of the second pole 90 of the reverse relay 58, and (b) the negative or reference (–) output of the SML 50.

In the state shown in FIG. 4, with the normal relay 56 and reverse relay 58 both de-energized and the contacts 60,62, 64,66 all in the normally closed position, the SML 50 is disconnected from the motor 54, and the motor input terminals 68,70 are shorted. Those inputs are electrically connected through pole 72 and normally closed contact 76 and through normally closed contact 82 and pole 78.

Energization of normal relay 56 electrically connects the positive (+) output of the SML 50 with the first input 68 of the motor 54 through the normally open contact 74 and pole 72, and electrically connects the reference (–) output of the SML 50 with the second motor input 70 through the normally open contact 86 and pole 84 and through the normally closed contact 82 and the pole 78. Alternatively, energization of reverse relay 58 electrically connects the positive (+) output of SML 50 with the second motor input 70 through normally open contact 80 and pole 78, and electrically connects the negative (–) output of SML 50 with the first motor input 68 through the normally open contact 92 and pole 90 and through the normally closed contact 76 and pole 72.

Figure 5:
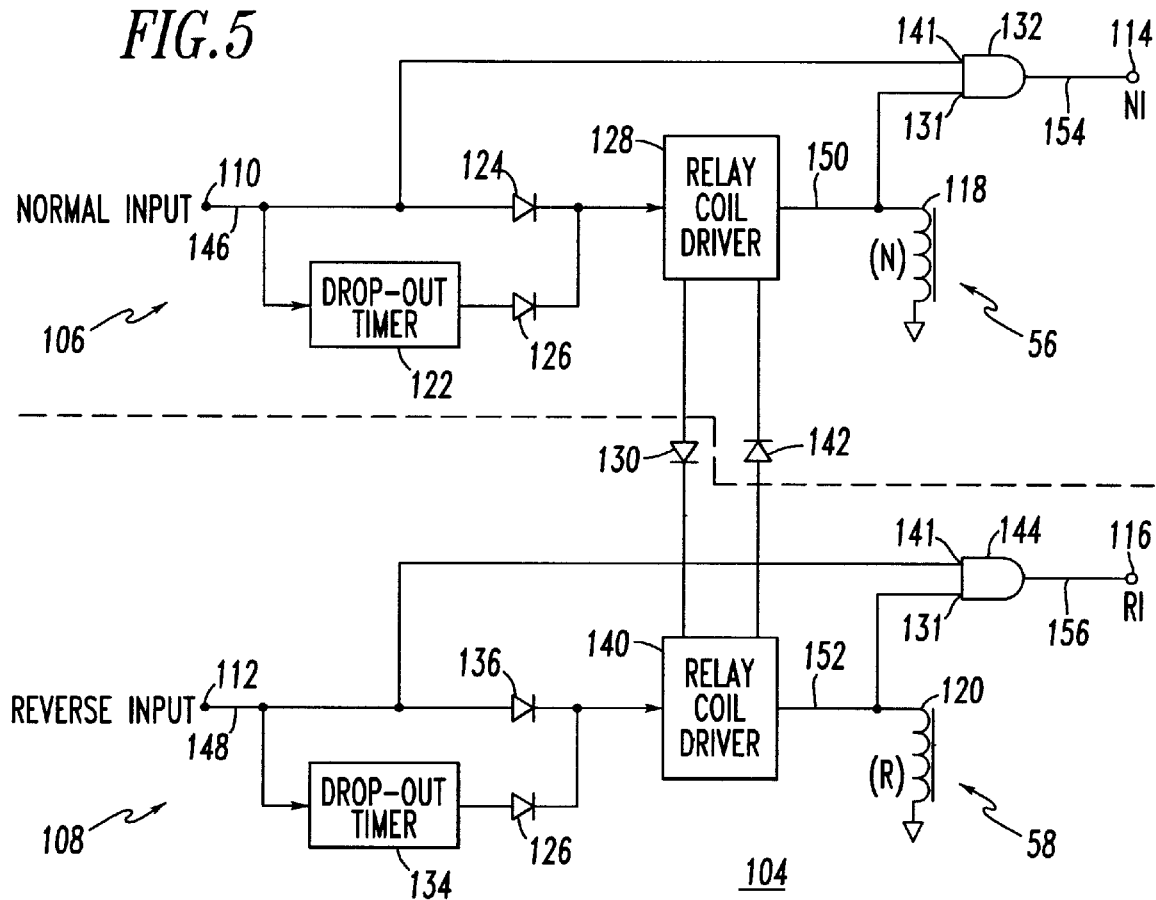
FIG. 5 is a block diagram of relay control logic for the relay contacts of FIG. 4.

Referring to FIG. 5, the relay control logic 104 for the MRU 52 of FIG. 4 is shown. The logic 104 includes a normal logic portion 106 and a reverse logic portion 108. The inputs 110,112 of the respective logic portions 106,108 are received from a suitable control source such as relay logic (not shown) or a programmable logic controller (not shown). The circuit 104 also provides NI and RI signals on respective outputs 114 and 116 to the SML 50 of FIG. 4, and controls the normal and reverse coils 118,120 of the normal and reverse relays 56,58, respectively.

The normal input signal at input 110 is applied to a drop-out timer 122 and to the anode of diode 124. The drop-out timer 122 provides an exemplary delay of about 2 seconds and, then applies the delayed normal input signal to the anode of diode 126. The cathodes of diodes 124,126 are electrically connected together and to the input of relay coil driver circuit 128. Whenever one or both of the normal input signal and the delayed normal input signal are active, the relay coil driver circuit 128 outputs a signal to energize the coil 118 of normal relay 56, outputs that signal to input 131 of two-input AND gate 132, and asserts an active-low signal through diode 142 to disable the corresponding relay coil driver circuit 140 of reverse logic portion 108. The other input 141 of the AND gate 132 is connected to the input 110 to receive the normal input signal.

The reverse logic portion 108, which includes drop-out timer 134, diode 136, diode 138, the relay coil driver circuit 140, the coil 120 of reverse relay 58, diode 130, and two-input AND gate 144, functions in a similar manner as the normal logic portion 106. Whenever the relay coil driver circuit 140 outputs the signal to energize the coil 120, an active-low signal through diode 130 is asserted to disable the corresponding relay coil driver circuit 128 of normal logic portion 106.

In order to prevent the contacts 60,62,64,66 of FIG. 4 from arcing, the relays 56,58 are not switched when current flows through those contacts. The drop-out timers 122,134 of FIG. 5 accomplish this by delaying the drop time of the relays 56,58 in order to allow the motor 54 to come to a stop before relays 56,58 are de-energized and the contacts 60,62, 64,66 are opened. An additional method is to control the output of the SML 50 of FIG. 4 by turning the conditional power source on only after the selected contacts 60,62,64,66 have been closed and, as discussed above, to open such contacts only after the power has been turned off for sufficient period of time (e.g., a few seconds). Furthermore, the exemplary diodes 130,142 between the driver circuits 128,140 also prevent both relays 56,58 from being energized at the same time, by determining which of the signals 146,148 becomes active before the other of those signals.

Figure 6:
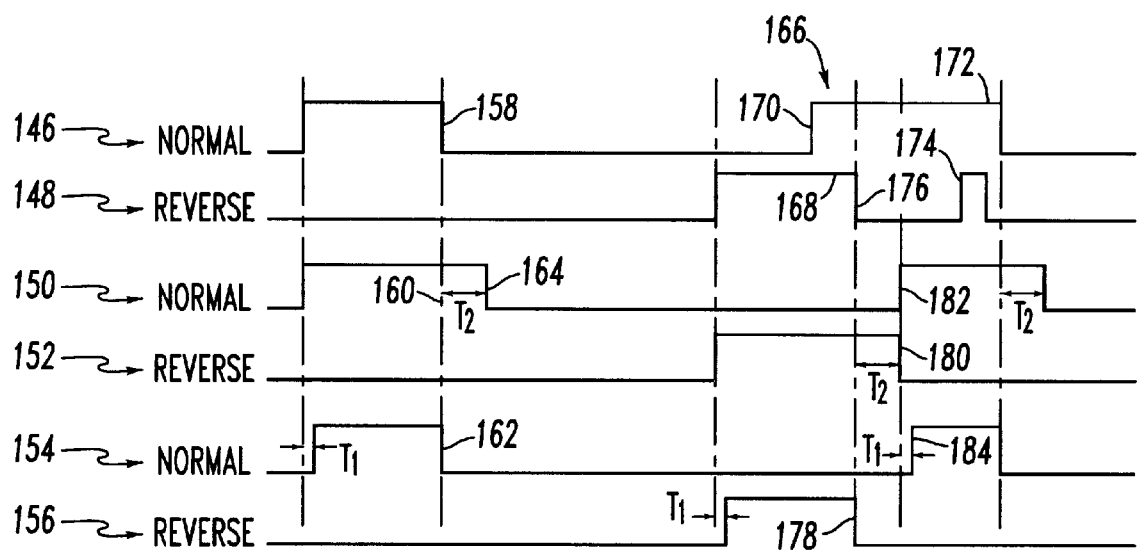
FIG. 6 is a timing diagram for the relay control logic of FIG. 5.

FIG. 6 is a timing diagram for the relay control logic 104 of FIG. 5 and shows the relationship between the normal and reverse input signals 146,148 of inputs 110,112, the normal and reverse relay coil voltages 150,152 for controlling the relays 56,58, and the normal (NI) and reverse (RI) output control signals 154,156 for enabling the SML 50. When the normal input signal 146 is active, the normal relay 56 is energized by normal relay coil voltage 150 and, then, after a suitable delay time, $T_1$ (e.g., about 50 ms), the normal output signal 154 to the SML 50 also turns on. For example, if the pick time of the relays 56,58 is between 20 and 40 ms, then the exemplary 50 ms delay ensures that the selected relay contacts 60,62,64,66 are closed before the output of the SML 50 is enabled. As discussed below in connection with FIGS. 7A–7B, the exemplary 50 ms delay circuits are built into the exemplary AND gates 132,144 (FIG. 5) which drive the outputs 114,116 to the SML 50, although such delay may equivalently be provided before or after those AND gates.

The normal relay 56 and the normal output signal 154 to the SML 50 remain energized during the time that the normal input signal 146 is active. When the normal input signal 146 becomes inactive (e.g., 0 volts) at 158, the relay drop-out timer 122 is started at 160, and the normal output signal 154 to the SML 50 becomes inactive at 162, thereby turning off the SML 50. Then, after a suitable delay time, $T_2$ (e.g., about 2 s), the relay drop-out timer 122 completes its timing function at 164, and the normal relay 56 is de-energized by normal output 150 going inactive. The reverse logic portion 108 functions to provide the reverse signals 148,152,156 in a similar manner.

As shown at 166, the feedback of the diodes 130,142 between the relay coil driver circuits 128,140 of FIG. 5 prevents both relays 56,58 from being energized by the normal and reverse outputs 150,152 at the same time. This also prevents both of the normal and reverse output signals 154,156 to the SML 50 from being turned on at the same time. Here, where the reverse input signal 148 is active at 168 when the normal input signal 146 also becomes active at 170, there is no change in operation, and the reverse relay 58 and the reverse output signal 156 remain energized and active. Similarly, where the normal input signal 146 is active at 172 when the reverse input signal 148 also becomes active at 174, there is no change in operation, and the normal relay 56 and the normal output signal 154 remain energized and active.

However, as shown at 176 of FIG. 6, if the reverse input signal 148 is turned off, then the SML 50 is turned off at 178, and the reverse relay 58 remains energized until the delay time, $T_2$, expires at 180. As soon as the reverse relay 58 drops, the normal relay 56 picks up at 182. Then, after the delay time, $T_1$, expires at 184, the normal output signal 154 is employed to turn on the SML 50. This allows the motor 54 to be reversed without stressing the motor or arcing the relay contacts 60,62,64,66.

Accordingly, with the timers and logic of the exemplary MRU 52, programming the external interlocking logic controller (not shown) which drives the normal and reverse signals 146,148 is greatly simplified. Hence, there is no longer a need to be concerned about possibly damaging the relay contacts 60,62,64,66 by switching them at the wrong time. Hence, as shown at 164 and 180, the relays 56,58 are switched a predetermined time, $T_2$, after the SML 50 turns off, in order that such relay contacts are not switched when the motor 54 is running.

Figure 7A:
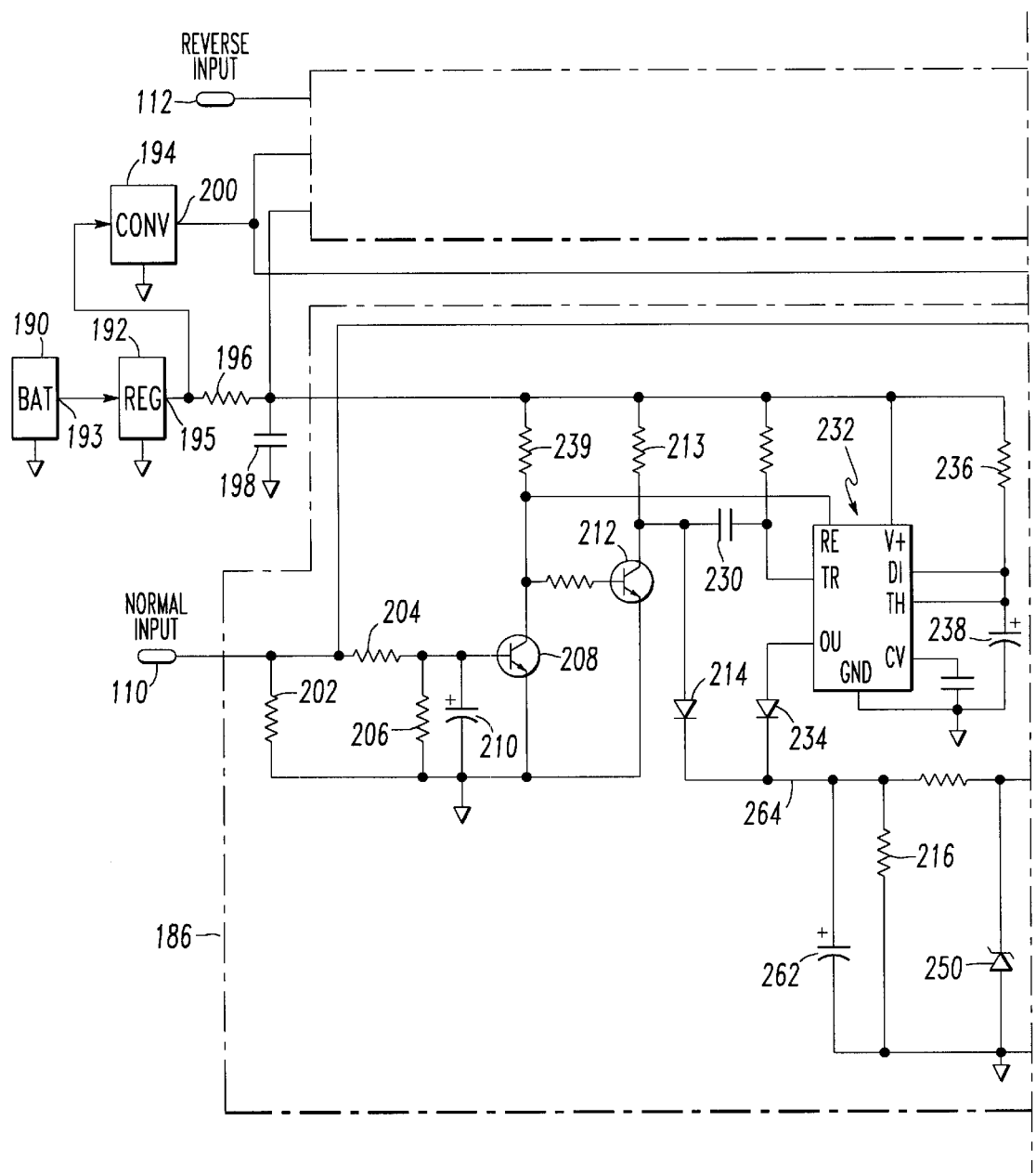
FIGS. 7A–7B are a schematic diagram of the relay control logic of FIG. 5.
Figure 7B:
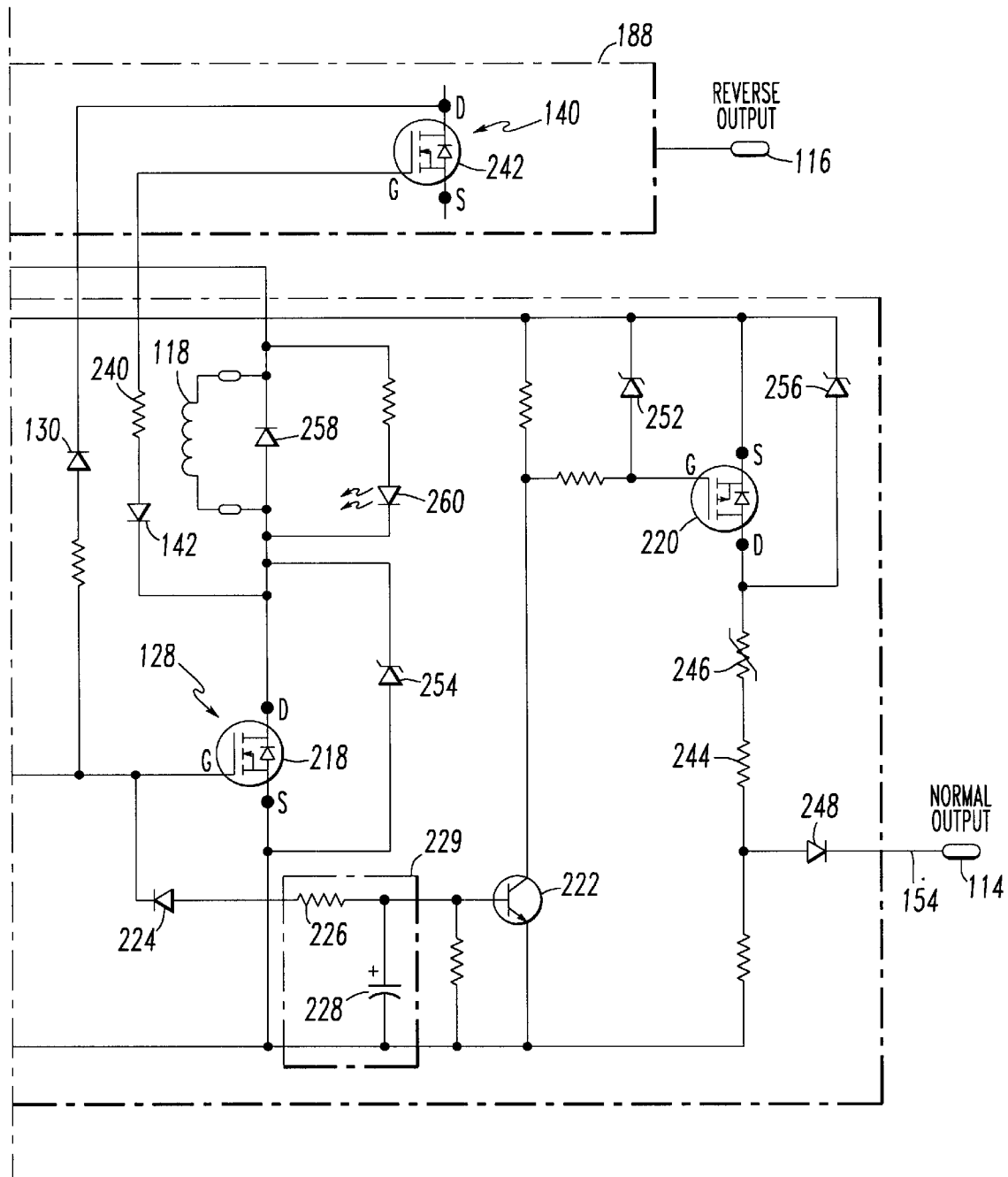

Referring to FIGS. 7A–7B the relay control logic 104 of FIG. 5 includes a normal circuit 186 and a reverse circuit 188. These circuits 186,188 are preferably powered from a battery 190 which powers a regulator (REG) 192 and, in turn, a boost or step-up converter (CONV) 194. The regulator 192 suitably current-limits the battery output 193 and provides reverse battery protection. The regulator output 195 is low-pass filtered by resistor 196 and capacitor 198. The converter 194 has an exemplary voltage of about 12 volts at output 200. The purpose of the converter 194 is to keep the relay coil voltage constant if and when the battery voltage drops below that constant voltage. At battery voltages above 12 volts, the converter 194 shuts down and the battery voltage passes through an inductor and diode (not shown) to the relay coils 118 and 120 (shown in FIG. 5).

The normal circuit 186 is described below. The reverse circuit 188 operates in a similar manner. At the normal input 110, resistor 202 provides a low impedance to ground to improve noise immunity. A resistor divider formed by resistors 204 and 206 increases the turn-on threshold of transistor 208, and capacitor 210 and resistor 206 form a low-pass filter to filter any check pulses (e.g., from a vital output) and any other high frequency noise. When the normal input 110 is energized, transistor 208 turns on and transistor 212 turns off. Current then flows through resistor 213, diode 214 and resistor 216 in order to provide a suitable voltage to turn-on FET transistor 218. In turn, transistor 218 energizes normal relay coil 118 with current from converter output 200. The voltage at normal input 110 also supplies power to the normal output 114 through FET transistor 220, which is a P-channel FET that turns on when its gate is pulled low by transistor 222. Transistor 222 is controlled by the gate drive of transistor 218. Zener diode 224 prevents the operation of transistor 222 when the gate of transistor 218 is below a suitable threshold voltage. Resistor 226 and capacitor 228 add an exemplary 50 ms time delay to the turn-on of transistors 222 and 220 after relay driver transistor 218 has been turned on. As discussed above in connection with FIGS. 5 and 6, the delay provided by delay circuit 229 allows the relay contacts of relay 56 of FIG. 4 to make before turning on the SML 50 which, in turn, applies power to them.

De-energizing the normal input 110 turns off transistor 208 and turns on transistor 212, thereby pulling one end of capacitor 230 to ground. This results in a negative going pulse on trigger input (TR) of timer 232 to start that timer. In response, the output (OU) of timer 232 goes high and feeds current through diode 234 and resistor 216 to keep transistor 218 turned on, and relay coil 118 energized. Resistor 236 and capacitor 238 set the exemplary time delay to approximately 2 or 2.5 seconds, although a wide range of delay times are possible. When that time expires, the output (OU) of timer 232 goes low, thus, turning off transistor 218 and dropping the normal relay coil 118. De-energizing the normal input 110 also removes power from the normal output 114, causing it to drop immediately. Transistor 208 also controls the reset input (RE) of timer 232, which input is normally pulled high and inactive by resistor 239. Every time the normal input 110 is energized, the timer 232 is reset and, thus, is ready to start timing when the normal input is removed (e.g., at 158 in FIG. 6).

Resistor 240 and the diode 142 provide feedback from the normal relay drive circuit 128 to the reverse relay driver circuit 140 of FIG. 5. When the normal relay coil 118 is energized, the cathode of diode 142 is pulled low which, in turn, pulls down the gate of the FET transistor 242 of the reverse circuit 188, thereby preventing the reverse relay coil 120 (shown in FIG. 5) from being energized. The feedback also keeps the transistor (not shown) corresponding to transistor 222 and the FET (not shown) corresponding to FET transistor 220 turned off, thereby preventing an output voltage from appearing at the reverse output 116. This is true even if a voltage is applied to the reverse input 112.

The normal output 114 is short circuit protected by resistor 244 and polyswitch 246. Diode 248 prevents the output circuit from operating if 12-volt power is inadvertently applied to the normal output 114. Zener diodes 250 and 252 limit the gate voltages to FET transistors 218 and 220, respectively, while transzorbs 254 and 256 limit the maximum voltage across those transistors. Diode 258 is a voltage snubber for the relay coil 118, while light emitting diode 260 indicates when that relay coil is energized. Capacitor 262 filters the relay drive signal 264 during the relatively brief transition time between when the normal output signal 154 is removed from output 114 and the timer 232 takes over control of the relay coil 118.

The exemplary motor control apparatus eliminates arcing in the relay contacts 60,62,64,66 of FIG. 4 by switching such contacts only when the power source 50 is turned off and the motor 54 has stopped rotating. This is accomplished by controlling the power source 50 and by adding drop out timers 122,134 for the respective normal and reverse relays 56,58. Furthermore, low cost, commercially available relays 56,58 may be employed instead of vital relays, since a vital power source 50 is employed to operate the motor 54 and the contacts are opened and closed with the power off. Alternatively, the mechanical relays 56,58 may be replaced by solid state relays (not shown), although there would be a corresponding increase in cost.

In summary, various advantages of the present apparatus include: (1) two-wire control of the switch machine motor 54; (2) shorting of the motor power leads 68,70 when the motor 54 is not being operated; (3) eliminating contact arcing by not switching the relay contacts 60,62,64,66 when power is on or when the motor 54 is rotating; (4) preventing operation of the normal and reverse relays 56,58 at the same time; and (5) built-in logic and timing to simplify external program control of the normal and reverse input signals 146,148.

Furthermore, by employing two wires between the exemplary motor control circuit 52 and the motor 54, one or three wires are eliminated, with the attendant wiring simplification and cost advantage, as compared to prior motor controls. Furthermore, the present invention eliminates two vital relays as required in prior systems.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A control apparatus for a railway switch machine including a reversible motor having two input terminals, said control apparatus comprising:
   a conditional power source having a voltage; and
   a circuit comprising:
      means for inputting the voltage from the power source,
      means for inputting a normal signal and a reverse signal,
      two output terminals for electrical connection to the two input terminals of said reversible motor, and
      output means for: (a) outputting the voltage to the two output terminals in response to the normal signal, (b) outputting an inverted polarity of the voltage to the two output terminals in response to the reverse signal, and (c) shorting the two output terminals in response to absence of both of the normal and reverse signals, wherein said output means includes a plurality of relays having a plurality of contacts; and means employing the normal and reverse signals of said means for inputting for turning off the voltage of said conditional power source for a predetermined time before switching the contacts of said relays.

2. The control apparatus as recited in claim 1, wherein said output means further includes means for closing the contacts of said relays before said voltage or the inverted polarity of the voltage is applied to the input terminals of said reversible motor; wherein said predetermined time is a first predetermined time; and wherein said means employing the normal and reverse signals of said means for inputting turns on said conditional power source a second predetermined time after the contacts of said relays are switched.

3. The control apparatus as recited in claim 1, wherein said output means further includes means for opening the contacts of said relays after said voltage or the inverted polarity of the voltage is removed from the input terminals of said reversible motor.

4. The control apparatus as recited in claim 3, wherein said output means further includes means for opening the contacts of said relays after said reversible motor is de-energized and has stopped rotating.

5. The control apparatus as recited in claim 1, wherein said output means further includes means for preventing switching of the contacts of said relays for said predetermined time after said voltage or the inverted polarity of the voltage is removed from the input terminals of said reversible motor in order to prevent said switching when said reversible motor is rotating.

6. The control apparatus as recited in claim 1, wherein said relays include a normal relay for outputting the voltage to the two output terminals in response to the normal signal, and a reverse relay for outputting the inverted polarity of the voltage to the two output terminals in response to the reverse signal; and wherein said output means further includes means for preventing energization of said normal and reverse relays at the same time.

7. A control apparatus for a motor of a railway switch machine, said motor having first and second inputs, said control apparatus comprising:

a power source having first and second outputs;

a first relay including a first pole having double throw contacts, and including a second pole having at least one contact, with the first pole of the first relay being electrically connected to the first input of the motor, and with a first contact of the first pole of the first relay being electrically connected to the first output of the power source;

a second relay including a first pole having double throw contacts, and including a second pole having at least one contact, with the first pole of the second relay being electrically connected to the second input of the motor, with a second contact of the first pole of the first relay being electrically connected to: (a) a second contact of the first pole of the second relay, (b) the second pole of the first relay, and (c) the second pole of the second relay, and with the contact of the second pole of the first relay being electrically connected to: (a) the contact of the second pole of the second relay, and (b) the second output of the power source;

means for inputting first and second signals; and means employing the first and second signals for controlling energization of the first or second relays, in order that: (a) energization of the first relay electrically connects the first output of the power source with the first input of the motor through the first contact and the first pole of the first relay, and electrically connects the second output of the power source with the second input of the motor through the contact and the second pole of the first relay and through the second contact and the first pole of the second relay, (b) energization of the second relay electrically connects the first output of the power source with the second input of the motor through the first contact and first pole of the second relay, and electrically connects the second output of the power source with the first input of the motor through the contact and the second pole of the second relay and through the second contact and the first pole of the first relay; and, otherwise, (c) energization of neither the first relay nor the second relay electrically connects the first input to the second input of the motor through the first pole and the second contact of the first relay and through the second contact and the first pole of the second relay.

8. The control apparatus of claim 7, wherein said power source is a conditional power supply.

9. The control apparatus of claim 8, wherein said conditional power supply includes at least one input having a signal with a first state and a second state; and wherein said conditional power supply is energized for the first state and is de-energized for the second state.

10. The control apparatus of claim 9, wherein said at least one input is two inputs each of which has a signal with the first state and the second state; and wherein said conditional power supply is energized for the first state of the signal of either of said two inputs.

11. The control apparatus of claim 10, wherein said means employing the first and second signals of said means for inputting includes two outputs each of which is electrically connected to a corresponding one of said two inputs of said conditional power supply.

12. The control apparatus of claim 11, wherein said means employing the first and second signals of said means for inputting includes means for outputting the first state of the signal of either of said two inputs a predetermined time after the corresponding one of the first and second signals is active, and means for outputting the second state of the signal of either of said two inputs when the corresponding one of the first and second signals is not active.

13. The control apparatus of claim 12, wherein said predetermined time is about 50 milliseconds.

14. The control apparatus of claim 11, wherein said means employing the first and second signals of said means for inputting includes means for energizing the corresponding one of the first and second relays when the corresponding one of the first and second signals is active, and means for de-energizing the corresponding one of the first and second relays a predetermined time after the corresponding one of the first and second signals is not active.

15. The control apparatus of claim 14, wherein said predetermined time is about 2 seconds.

16. The control apparatus of claim 11, wherein said means employing the first and second signals of said means for inputting includes means for energizing the corresponding one of the first and second relays before outputting the first state of the signal of either of said two inputs, and means for de-energizing the corresponding one of the first and second relays after outputting the second state of the signal of either of said two inputs.

17. The control apparatus of claim 7, wherein said means employing the first and second signals of said means for inputting includes means for selectively energizing up to one of the first and second relays.

18. The control apparatus of claim 17, wherein said means employing the first and second signals of said means for inputting includes means for disabling one of the first and second relays whenever the other one of said first and second relays is energized.

19. The control apparatus of claim 7, wherein the at least one contact of the second pole of the first relay is a normally open contact, and wherein the at least one contact of the second pole of the second relay is a normally open contact.

20. The control apparatus of claim 7, wherein the first pole having double throw contacts of the first and second relays includes a normally open contact and a normally closed contact.

21. The control apparatus of claim 20, wherein when the first relay is energized, the normally open contact of the first relay electrically connects the first output of the power source to the first input of the motor; and wherein when the second relay is energized, the normally open contact of the second relay electrically connects the first output of the power source to the second input of the motor.

22. The control apparatus of claim 7, wherein said means employing the first and second signals of said means for inputting includes means for determining which of the first and second signals is active before the other of said signals, means for energizing the corresponding one of the first and second relays based upon which of the first and second signals is active before the other of said signals, and means for deenergizing the other of the first and second relays based upon which of the first and second signals is not active before the other of said signals.

23. The control apparatus of claim 7, wherein the second pole of at least one of said first and second relays includes double throw contacts.

24. The control apparatus as recited in claim 7, wherein said means employing the first and second signals of said means for inputting includes means for turning the power source off and, then, de-energizing the first and second relays in order that the first and second motor inputs are shorted.

25. The control apparatus as recited in claim 7, wherein said means employing the first and second signals of said means for inputting includes means for turning the power source off and then switching the contacts of the first and second relays.

26. The control apparatus as recited in claim 25, wherein said means employing the first and second signals of said means for inputting further includes means for switching the contacts of the first and second relays a predetermined time after said means for turning the power source off turns the power source off, in order that said contacts are not switched when said motor is running.

27. The control apparatus as recited in claim 7, wherein said motor is a reversible motor; and wherein the first and second signals are normal and reverse signals, respectively.

* * * * *

UNITED STATES PATENT AND TRADEMARK OFFICE
CERTIFICATE OF CORRECTION

PATENT NO. : 6,366,041 B1
DATED : April 2, 2002
INVENTOR(S) : Robert P. Bozio et al.

It is certified that error appears in the above-identified patent and that said Letters Patent is hereby corrected as shown below:

<u>Column 2,</u>
Line 38, "3-wire or wire" should read -- 3-wire or 5-wire --.

Signed and Sealed this

Fourth Day of June, 2002

Attest:

Attesting Officer

JAMES E. ROGAN
*Director of the United States Patent and Trademark Office*